(No Model.)
J. WEATHERWAX.
KNOB ATTACHMENT.
No. 516,670. Patented Mar. 20, 1894.
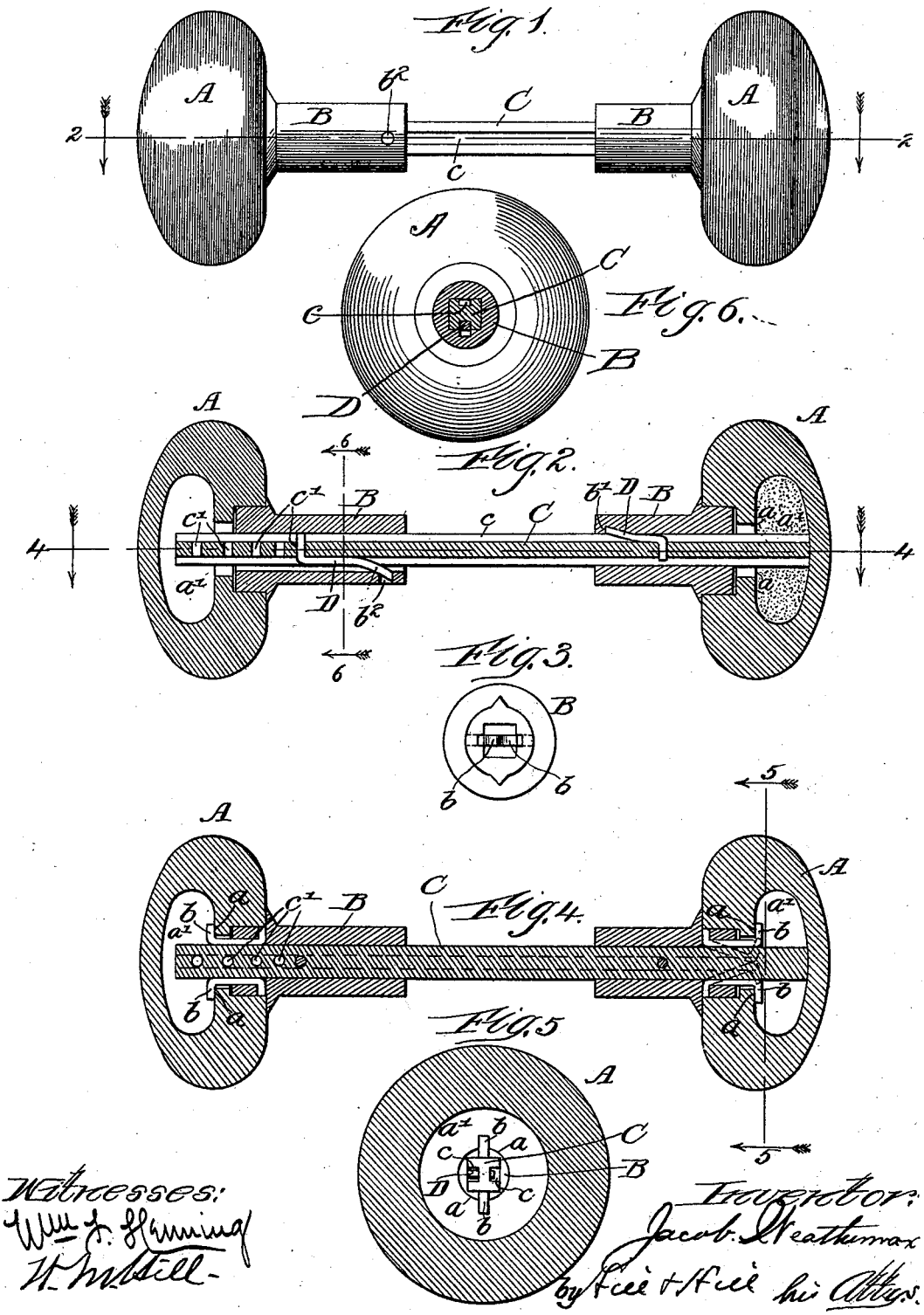

UNITED STATES PATENT OFFICE.

JACOB WEATHERWAX, OF ABERDEEN, WASHINGTON.

KNOB ATTACHMENT.

SPECIFICATION forming part of Letters Patent No. 516,670, dated March 20, 1894.

Application filed May 22, 1893. Serial No. 475,167. (No model.)

*To all whom it may concern:*

Be it known that I, JACOB WEATHERWAX, a citizen of the United States, residing at Aberdeen, county of Chehalis, State of Washington, have invented certain new and useful Improvements in Knob-Fasteners, of which the following is a specification.

Referring to the accompanying drawings, wherein like reference letters indicate like or corresponding parts;—Figure 1, is an external view of my improvement. Fig. 2, is a longitudinal section of the same in line 2—2 of Fig. 1. Fig. 3, is a view of the end of the shank which enters the knob. Fig. 4, is a longitudinal section in line 4—4 of Fig. 2, and Fig. 5, is a transverse section of the knob, in line 5—5 of Fig. 4. Fig. 6, is an end view of the shank and spindle.

My invention consists in an improved means for securing the knob-shank upon the spindle whereby it is quickly and easily adjusted to the thickness of different doors, and the said parts may be readily disconnected to remove them from the door.

In the drawings, A, indicates the knob, within which is a cavity, $a'$, forming the continuous shoulder or shoulders $a$. A noncircular or square opening is formed in the knob to receive the shank. The shank, B, has upon the end which enters the knob two or more hooks $b\ b$, secured in any suitable manner. Before the knob is secured to the shank, the hooks may assume the position shown in dotted lines in Fig. 4. Upon placing the parts in their proper relation with one another, the entrance of the ends of the spindle C, forces the ends of the hooks outward, the bent ends coming back of the shoulder $a\ a$; the shank and knob may then be secured to the spindle in any satisfactory manner; the hooks are thus firmly held outward and prevent the separation of the parts; and the non-circular or squared end of the shank fitting into the similar opening in the knob prevents the knob from turning on the shank, and thus the parts are firmly and rigidly secured together. If desired, cement in a plastic state may be introduced into the cavity of the knob before the spindle is entered, when the setting of the cement will permanently hold the knobs in engagement with the shoulder $a$ and allow the spindle to be withdrawn without permitting the shank and knob to become disconnected. In the preferred form, I construct the end of the spindle so that it cannot turn in the shank, and make a groove $c$ in one or more of the faces thereof. I make also an aperture $c'$ in the spindle in line with the groove, and construct the spring-catch D, with one end adapted to fit into, and be seated in, said aperture, while the other end has an outward tension and engages with a shoulder, $b'$, upon the inner side of the shank opening, (see Fig. 2.) The end of the spindle extends close to the back wall of the cavity $a$ and thus the shank cannot move longitudinally upon it. It is obvious that the groove $c$ may be formed in the shank and be omitted in the spindle, or a groove be formed in both parts, if desired. As thus described, the parts are all firmly and permanently secured together.

To adapt the parts to doors of various thicknesses, I prefer to construct a series of perforations, $c$, near the other end of the spindle, in line with groove $c'$, and also make a perforation $b^2$ in the shank B in line with the catch D. The catch may then be moved along the spindle and seated in any one of the perforations. When the parts are in position, a strong pressure forces them together, and the end of the catch engages with the shoulder $b'$ which may in this case, if preferred, consist of the edge of the perforation $b^2$, simply. The parts may be readily disconnected by using an instrument to depress the catch below the shoulder. It is obvious that this means of adjustment may be employed independently of any particular way of attaching the knob and shank together, and also obvious that this mode of securing the shank and knob may be used independently of the means of adjustment herein shown. In practice, however, I prefer to combine these points in the same device.

Having thus described my invention, what I claim as new, and desire to secure by Letters Patent, is—

In a device of the kind described, a shank having an interior shoulder formed by a perforation near its outer end; and a knob secured to said shank; in combination with a spindle, having a series of adjusting perforations in one or both ends in line with the perforation in the shank; a detachable spring catch adapted at one end to fit into any one of the adjusting perforations, and at its outer end to engage with the shoulder in the shank whereby the shank may be adjusted longitudinally upon the spindle; and means for permitting the spring catch to be depressed sufficiently to allow the spindle and catch to pass into the shank, when the parts are fitted together; substantially as described.

JACOB WEATHERWAX.

In presence of—
 WILLIAM M. HILL,
 JOHN W. HILL.

It is hereby certified that in Letters Patent No. 516,670, granted March 20, 1894, upon the application of Jacob Weatherwax, of Aberdeen, Washington, for an improvement in "Knob Attachments," errors appear in the printed specification requiring correction, as follows: In line 74, page 1, the reference letter "c" should read $c^1$, and in line 75, same page, the reference letter "$c^1$" should read $c$; and that the Letters Patent should be read with these corrections therein that the same may conform to the record of the case in the Patent Office.

Signed, countersigned, and sealed this 27th day of March, A. D. 1894.

[SEAL.]

JNO. M. REYNOLDS,
*Assistant Secretary of the Interior.*

Countersigned:
JOHN S. SEYMOUR,
*Commissioner of Patents.*